Aug. 22, 1950     A. U. BRYANT     2,519,541
VALVE CONSTRUCTION
Filed Nov. 8, 1947
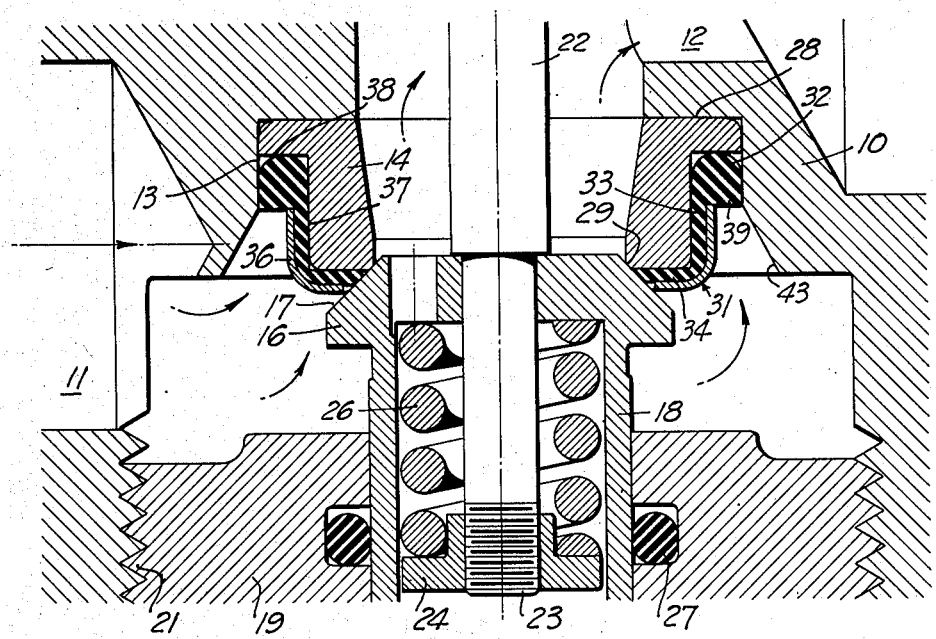
FIG_1_
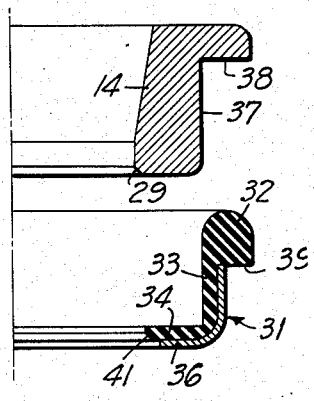
FIG_2_
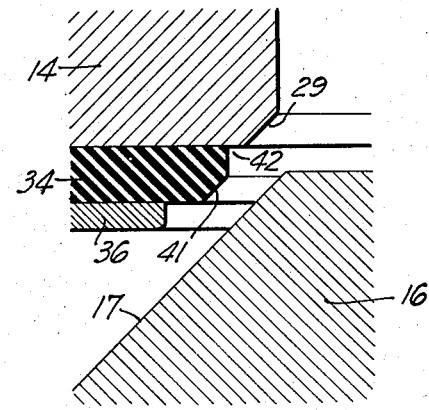
FIG_3_
INVENTOR
Austin U. Bryant
BY
ATTORNEYS

UNITED STATES PATENT OFFICE 2,519,541

VALVE CONSTRUCTION

Austin U. Bryant, Berkeley, Calif., assignor to Fluid Control Engineering Co., a partnership Application November 8, 1947, Serial No. 784,834

3 Claims. (Cl. 251—167)

This invention relates generally to the construction of valves of the type making use of a valve member movable in opposite directions between open and closed positions relative to a stationary valve seat.

Many valves of the above type make use of metal for forming the valve working surfaces. Aside from the fact that such metal surfaces must be accurately formed and smoothly finished to provide an effective seal, it is difficult to maintain such valves in condition for fluid-tight shut-off due to foreign material which may find its way between the valve working surfaces or to corrosion, mutilation or wear of the valve working surfaces which may occur.

In order to provide a more effective fluid-tight shut-off it has been proposed to utilize a member of resilient material mounted upon the valve seat, and having a peripheral surface adapted to engage and seal upon the valve member. Such a valve construction is disclosed for example in Gannon application Serial No. 536,556, filed May 20, 1944, now Patent No. 2,485,092 granted October 18, 1949. However the construction as disclosed in said Gannon application is relatively difficult to manufacture, particularly in that it requires accurate manufacture and assembly of a thin rubber annulus which is retained upon the inflow side of the seat.

Aside from valves of the type described above utilizing a resilient member in conjunction with a metal seat to aid fluid-tight shut-off, there has been no satisfactory way in the past to removably mount a metal seat ring in the body of a valve of the globe or poppet type. Soldering or brazing of the ring within the valve body is effective in preventing leakage past the seat ring, but it requires a special brazing operation during manufacture, and provides an assembly which does not permit ready removal for servicing or replacing the seat ring. The same applies to the use of a weld seal between the seat ring and the body. Threaded connections or threaded clamping devices, which are sometimes used, are likewise expensive to manufacture and assemble, and offer considerable difficulty to ready replacement of the ring.

It is an object of the present invention to provide an improved type of valve seat assembly, incorporating a member of resilient material which has a peripheral edge portion for sealing against the valve member, and which member is constructed and mounted in a novel manner to facilitate manufacture.

Another object of the invention is to provide a valve assembly which provides an effective seal against leakage between the metal seat ring and the body, and which permits ready removal of the ring for repair or replacement.

Another object of the invention is to provide a novel assembly for valves of the above character which serves the combined purposes of preventing leakage between the metal seat ring and the body, and to provide a fluid-tight seal with the valve member for closed position of the same.

Additional objects of the invention will appear from the following description in which the preferred embodiment has been set forth in detail in conjunction with the accompanying drawing.

Referring to the drawing:

Figure 1 is a side elevational view in section illustrating a valve construction incorporating the present invention.

Figure 2 is an exploded view illustrating the relationship between the seat ring and the member formed of resilient material which is fitted upon the same.

Figure 3 is an enlarged cross-sectional detail serving to show the manner in which a fluid-tight seal is established between the valve member and the seat ring assembly.

The construction as illustrated in Figure 1 of the drawing consists of a valve body 10 having inflow and outflow passes 11 and 12, and representative of a body such as is used in the construction of automatic regulating valves, or valves of the manually operated type. The body is provided with an inner bore 13 adapted to receive the metal seat ring 14. A valve member 16, having a conical valve working surface 17, cooperates with the ring 14 and is movable in opposite directions between open and closed positions. In the particular instance illustrated by way of example, the valve member is mounted upon the upper end of a sleeve 18, which in turn is slidably fitted within the body closure 19. This closure in turn may have a threaded connection 21 with the main part of the body.

The stem 22 or like operating member is attached to the valve member 16, and in the instance illustrated the end portion 23 of the stem is extended in through the valve member 16, and is provided with a nut 24 which seats one end of the compression spring 26. Leakage between the sleeve 18 and the body closure 19 is prevented by suitable means, represented in this instance by the resilient O ring 27.

The metal seat ring 14 normally has its outflow side in firm abutment with the annular shoulder 28 formed on the body. Its inflow side is provided with a conical valve working surface 29 adapted to contact the surface 17 of the valve member 16.

The seat assembly includes a cup-shaped member 31 which is fitted over the metal seat ring 14 on the inflow side of the same. As will be presently explained the member 31 incorporates means which prevents leakage between the seat ring 14 and the body without interfering with ready removal of the seat ring, and in addition it provides means forming an effective seal between the seat ring and the valve member when the latter is in closed position.

In the preferred construction of the member 31 shown in Figure 2, the same consists of a ring 32 of suitable resilient material, such as natural or synthetic rubber, together with a substantially cylindrical shaped extension 33 from the ring 32, and a substantially flat annulus 34. All of these portions 32, 33, 34 are formed integral and of resilient material. It is desirable to provide a relatively rigid cup-shaped metal member 36 with its inner surfaces bonded to the portions 33 and 34. The parts just described are dimensioned to fit snugly over the cylindrical surface 37 of the seat ring 14, with the ring 32 brought into engagement with the annular shoulder 38. Ring 32 is dimensioned in such a manner that when fitted within the bore 13 of the body as illustrated in Figure 1, it is compressed somewhat in a radial direction, the degree of compression being sufficient to insure a fluid-tight seal at all times. Ring 32 may be contoured to provide a right angle corner portion 39, which is presented to the pressure in the inflow passage 11, or this portion may be rounded.

The annulus 34 can be dimensioned substantially as illustrated in Figure 3. It has an inner peripheral edge provided with a conical shaped surface 41 adapted to contact the surface 17 of the valve member. It will be noted that surface 41 extends inwardly a slight amount with respect to the projected cone of surface 29, whereby when the valve member moves to full closed position, surface 41 engages surface 17 immediately prior to bringing the surfaces 17 and 29 into engagement. Bringing surfaces 17 and 29 into contact necessarily causes some compression of the inner peripheral portion of the annulus 34, but such compression does not cause a pinching of the rubber, because the compressed rubber may expand into the adjacent annular cavity 42.

In practice the member 31 can be formed complete by a suitable molding operation with molds of proper accuracy. The metal member 36 can be applied in the mold, in order to insure a proper bond during curing of the rubber.

Operation and use of the improvement described above can be explained as follows: In manufacturing the valve the member 31 is fitted upon the metal seat ring 14, and this assembly is then inserted into the bore 13 of the valve body with the outflow side of the seat ring in abutment with the annular shoulder 28. This operation requires relatively little effort and can be a simple manual assembly operation without special tools. After being positioned in this manner frictional engagement of the resilient ring 32 with the body and the metal seat ring retains the seat in place. Fitting of the member 31 upon the seat ring brings the resilient annulus 34 into proper position upon the inflow side of the seat ring, with the surface 41 properly positioned to effectively seal upon the valve member 16. Therefore a fluid-tight seal is maintained with respect to the valve member when the latter is in full closed position. The resilient ring 32 not only frictionally retains the seat ring in place, but also resists relatively high fluid pressure differentials. The pressure differential from the inflow side presses against the ring 32 and more effectively urges the surfaces of this ring into sealing contact with the body and the seat ring. Thus the seat ring is effectively sealed with respect to the body.

It will be noted that the bore 13 below the resilient ring 32 is made divergent or flared as indicated at 43. This serves the useful purpose of preventing injury to the valve in the event a relatively high back pressure is applied to the same. For example if back pressure should be sufficient to urge the seat ring assembly downwardly relative to the body, the resilient ring 32 will be temporarily withdrawn from sealing contact with the bore 13, thus preventing the displacement of this ring relative to the metal seat ring 14. Thereafter, when normal conditions are restored, pressure upon the inflow side will return the assembly to normal position.

The improvement described above is applicable to a wide variety of valves and regulating devices. It greatly facilitates removal of a seat ring for repair and replacement. Because of the relatively loose fit of the seat ring, distortion of the body may occur without accompanying distortion of the ring.

I claim:

1. In a valve construction of the type making use of a seat ring fitted in a valve body and a valve member movable in opposite directions relative to the seat ring to control flow of fluid through the orifice of the same, the improvement comprising a ring of resilient material serving to seal the seat ring against leakage between the ring and the body, and a member of resilient material formed integral with said first named ring of resilient material and arranged to seal upon the valve member when the valve member is moved to closed position relative to the seat ring, said last named member being of a wall thickness substantially less than the seal ring and having a portion extending inwardly on the inflow end face of the seat ring which presents an inner circular edge for sealing contact with the valve member.

2. In a valve construction of the type making use of a metal seat ring fitted in a valve body and a valve member movable in opposite directions to control flow of fluid through the orifice of the seat ring, the improvement comprising a seal ring of resilient material surrounding the seat ring and serving to seal against leakage between the seat ring and the body, and a member of resilient material formed integral with the said ring of resilient material and disposed upon the inflow side of the seat ring to seal upon the valve member when the latter is moved to closed position against the seat ring, said last named member being of substantially L-shaped cross-sectional contour with a substantially planar portion on the inflow side of the seat ring, said planar portion presenting an inner circular edge for sealing contact with the valve member.

3. In a valve construction of the type making use of a metal seat ring fitted in a valve body and a valve member movable in opposite directions to control flow of fluid through the orifice of the seat ring, the improvement comprising a seal ring of resilient material surrounding the seat ring and serving to seal against leakage between the seat ring and the body, and a member of resilient material formed integral with the said seal ring and disposed upon the inflow side of the seat ring to seal upon the valve member when the latter is moved to closed position against the seat ring, said last named member being substantially L-shaped in cross-sectional contour with a substantially planar portion on the inflow side of the seat ring, said planar portion presenting an inner circular edge for sealing contact with the valve member, and a metal retaining ring substantially L-shaped in cross-sectional contour and fitted over said last named member on the inflow side of the seat.

AUSTIN U. BRYANT.

REFERENCES CITED

The following references are of record in the file of this patent:

UNITED STATES PATENTS

| Number | Name | Date |
|---|---|---|
| 2,060,748 | Roberts | Nov. 10, 1936 |
| 2,182,278 | Brauer | Dec. 5, 1939 |
| 2,260,381 | Kennon | Oct. 28, 1941 |
| 2,263,750 | Willke | Nov. 25, 1941 |
| 2,348,548 | Koehler | May 9, 1944 |